United States Patent
Laughlin

(10) Patent No.: US 7,663,269 B2
(45) Date of Patent: Feb. 16, 2010

(54) HIGH BANDWIDTH LINEAR ACTUATOR FOR STEERING MIRROR APPLICATIONS

(75) Inventor: Darren R. Laughlin, Albuquerque, NM (US)

(73) Assignee: A-TECH Corporation, Albuquerque, NM (US)

( * ) Notice: Subject to any disclaimer, the term of this patent is extended or adjusted under 35 U.S.C. 154(b) by 312 days.

(21) Appl. No.: 11/610,280

(22) Filed: Dec. 13, 2006

(65) Prior Publication Data

US 2008/0143194 A1 Jun. 19, 2008

(51) Int. Cl.
*H02K 41/00* (2006.01)
(52) U.S. Cl. .................... 310/12; 310/13; 310/15
(58) Field of Classification Search ............ 310/12, 310/13, 15
See application file for complete search history.

(56) References Cited

U.S. PATENT DOCUMENTS

| | | | |
|---|---|---|---|
| 4,718,276 A | | 1/1988 | Laughlin |
| 5,023,495 A | * | 6/1991 | Ohsaka et al. ............ 310/12 |
| 5,067,351 A | | 11/1991 | Laughlin |
| 5,170,104 A | | 12/1992 | Lughlin |
| 5,176,030 A | | 1/1993 | Laughlin |
| 5,225,725 A | * | 7/1993 | Shiraki et al. ............ 310/12 |
| 5,461,919 A | | 10/1995 | Laughlin |
| 5,469,053 A | | 11/1995 | Laughlin |
| 5,665,912 A | | 9/1997 | Laughlin |
| 5,696,645 A | | 12/1997 | Laughlin |
| 5,820,113 A | | 10/1998 | Laughlin |
| 5,831,352 A | * | 11/1998 | Takei ...................... 310/12 |
| 6,173,611 B1 | | 1/2001 | Laughlin |
| 6,653,611 B2 | | 11/2003 | Eckelkamp-Baker et al. |
| 6,664,664 B2 | * | 12/2003 | Botos et al. ............... 310/12 |
| 6,700,109 B2 | | 3/2004 | Eckelkamp-Baker et al. |
| 7,171,853 B1 | | 2/2007 | Laughlin |
| 7,227,111 B2 | | 6/2007 | Eckelkamp-Baker et al. |
| 2002/0181839 A1 | | 12/2002 | Brown et al. |
| 2004/0070302 A1 | | 4/2004 | Parker et al. |

FOREIGN PATENT DOCUMENTS

WO    WO 97/44654 A1    11/1997

* cited by examiner

*Primary Examiner*—Hae Moon Hyeon
(74) *Attorney, Agent, or Firm*—Philip D. Askenazy; Peacock Myers, P.C.

(57) ABSTRACT

A printed circuit board (PCB) coil linear actuator is disclosed. The actuator includes a coil assembly and a magnet assembly. The coil assembly includes a plurality of PCB coils electrically connected in series. The PCB coils arranged in a row and adjacent PCB coils are separated by a gap. Each PCB coil includes a low aspect ratio, multi-layer coil member disposed on a board member. The actuator assembly includes a plurality of magnet units arranged in a row, wherein adjacent magnet units are separated by a gap. When the actuator is assembled, the PCB coils arranged in alternating sequence with the magnet units. The PCB coil linear actuator is intended to replace traditional slotted bobbin voice coil actuators (VCAs) and is particularly useful in fast steering mirror (FSM) applications. The PCB coil linear actuator provides many advantages over a VCA of an equivalent motor constant, including improved performance, lower weight and a lower profile.

15 Claims, 12 Drawing Sheets

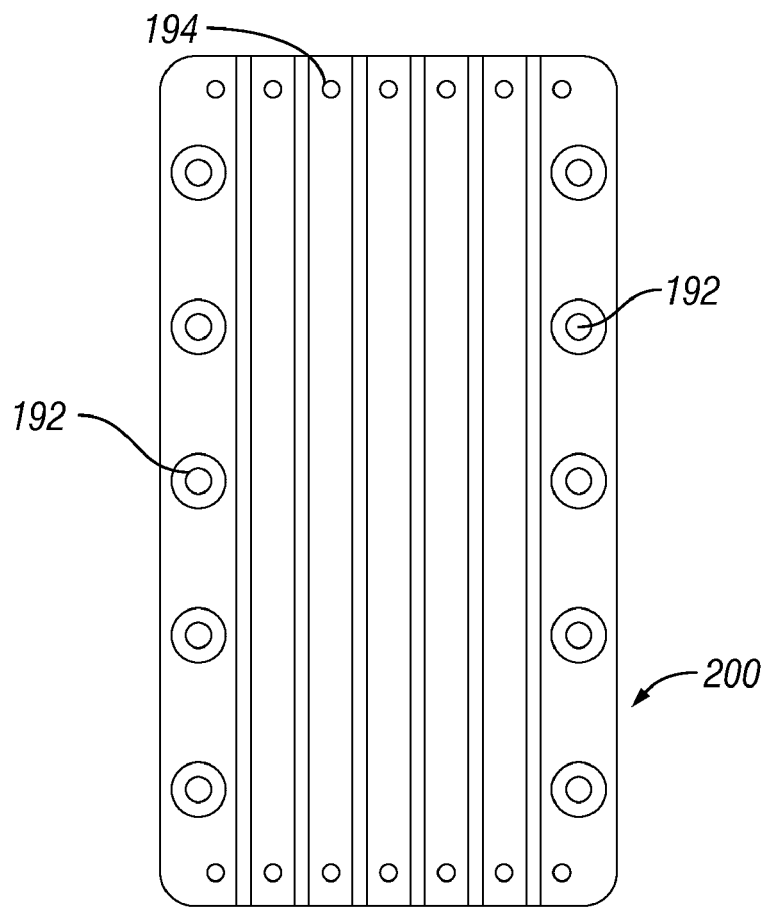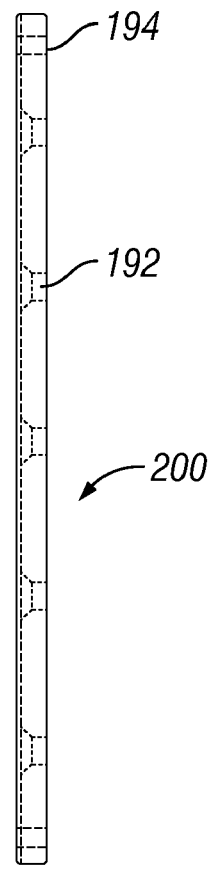
*FIG. 13A*
*FIG. 13B*
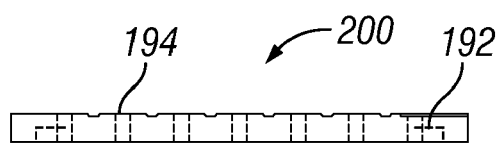
*FIG. 13C*

FSM Actuator Magnitude Response.

HIGH BANDWIDTH LINEAR ACTUATOR FOR STEERING MIRROR APPLICATIONS

This invention was made with Government support under contract FA9453-05-M-0070 awarded by the AFRL/PK8VV Det 8 Air Force Research Laboratory. The Government has certain rights in this invention.

BACKGROUND

A voice coil actuator (VCA) is typically used as the actuator in fast steering mirrors (FSM). A VCA typically includes a coil wrapped around a slotted bobbin. An example of a conventional VCA 10 is shown in FIGS. 1 and 2. As shown in FIGS. 1 and 2, the VCA 10 includes a housing 20, a magnet assembly 40 disposed within the housing 20 and a coil assembly 60 disposed within the housing 20. The coil assembly 60 includes a coil member 62 wound about a slotted bobbin 64.

It is desirable to provide an actuator having improved performance, lower weight and a lower profile in comparison to conventional voice coil actuators.

SUMMARY

A printed circuit board (PCB) coil linear actuator is disclosed. The actuator includes a coil assembly for attaching to a base side of a device, such as a fast steering mirror (FSM), and a magnet assembly for attaching to a moveable side of the device, such as a mirror side of a FSM. In some cases the reverse is also possible where the coil assembly is attached to the mirror and the magnet assembly is attached to the base.

The coil assembly contains a plurality of PCB coils connected in series. Each PCB coil includes a low-profile, oval-shaped coil member having multiple coil layers, wherein the coil member is disposed on a board member that is secured to base of the coil assembly.

The actuator further includes a magnet assembly having a plurality of magnet units secured to a base of the magnet assembly and positioned in line with the PCB coils such that the PCB coils and magnet units are arranged in alternating fashion along the length of the actuator. The magnet units each include a lower magnet and an upper magnet having opposite polarizations, with their polar axes being perpendicular to the planes of the coil members. Pole pieces, or shunts, are positioned outside of the magnets in the outermost magnet units in order to close the magnetic circuit in the actuator.

The inventive PCB coil actuator provides several advantages over known voice coil actuators (VCAs). Such advantages include:

Highly reliable manufacturing without coil winding
Modular design enabling quick application matching
Reduced assembly time
Simpler electromechanical interface
Parallel/serial winding combinations can be jumpered directly on the PCB coil
Excellent thermal conductivity to the mounting base of the coil assembly
Very high shock and vibration tolerance
High rigidity resulting in exceptional high frequency performance The invention can best be understood in the following detailed description with reference to the attached drawing figures.

BRIEF DESCRIPTION OF THE DRAWINGS

FIGS. 13A-13C are top, side and end views, respectively, of a magnet base of the magnet assembly of FIG. 11.

DETAILED DESCRIPTION

A PCB coil linear actuator according to one embodiment of the invention is described in the following paragraphs with reference to FIGS. 1-21. Such an actuator is particularly useful in fast steering mirror (FSM) applications, however other uses are envisioned.

Figure 1:
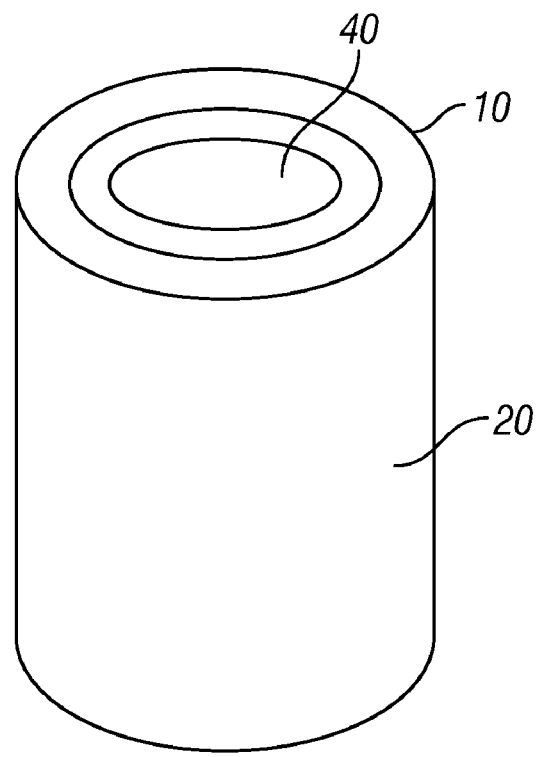
FIG. 1 is a perspective view of a conventional voice coil actuator.
Figure 2:
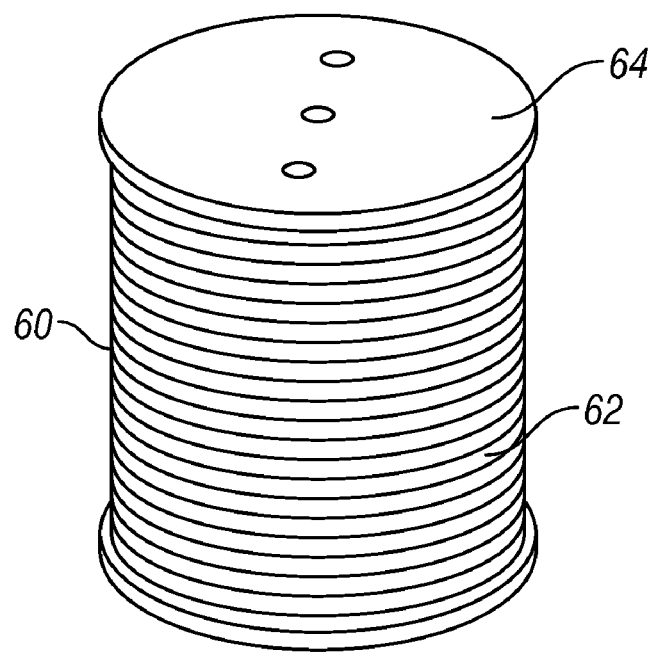
FIG. 2 is a perspective view of a bobbin and voice coil of the voice coil actuator of FIG. 1.
Figure 3:
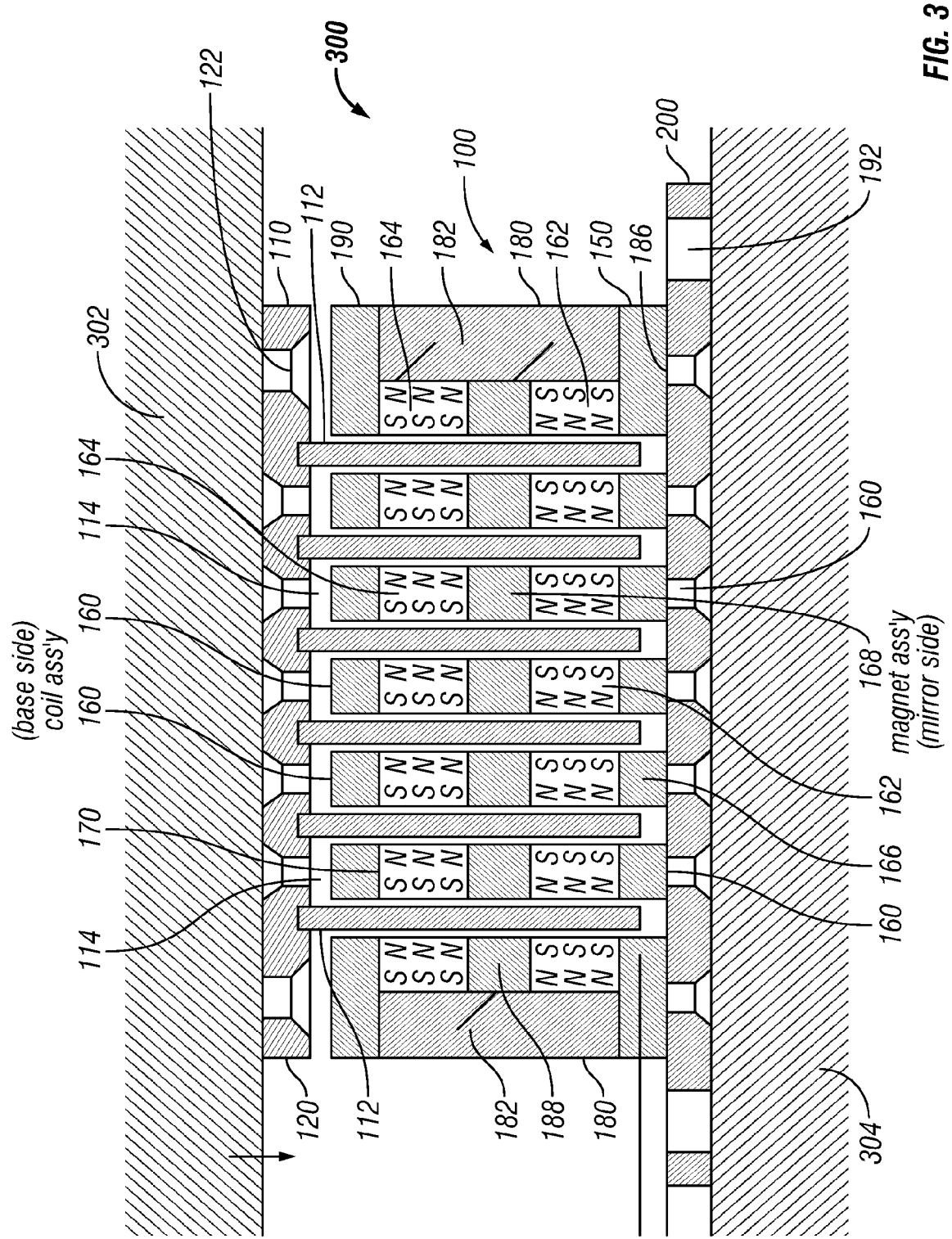
FIG. 3 is a side sectional view of a PCB coil linear actuator according to an embodiment of the invention.

FIG. 3 shows a PCB coil linear actuator 100. The actuator 100 includes a coil assembly 110 and a magnet assembly 150, which will now be described in detail.

Figure 4:
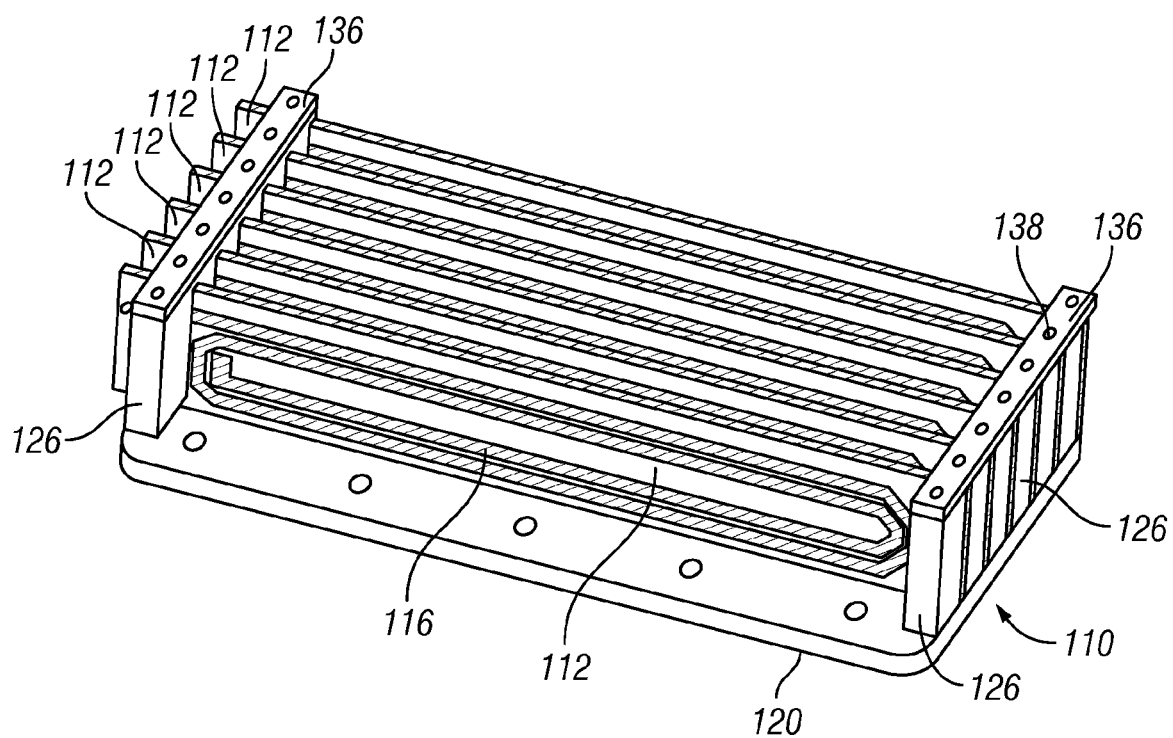
FIG. 4 is a perspective view of a coil assembly of the PCB coil linear actuator of FIG. 3.
Figure 8A:
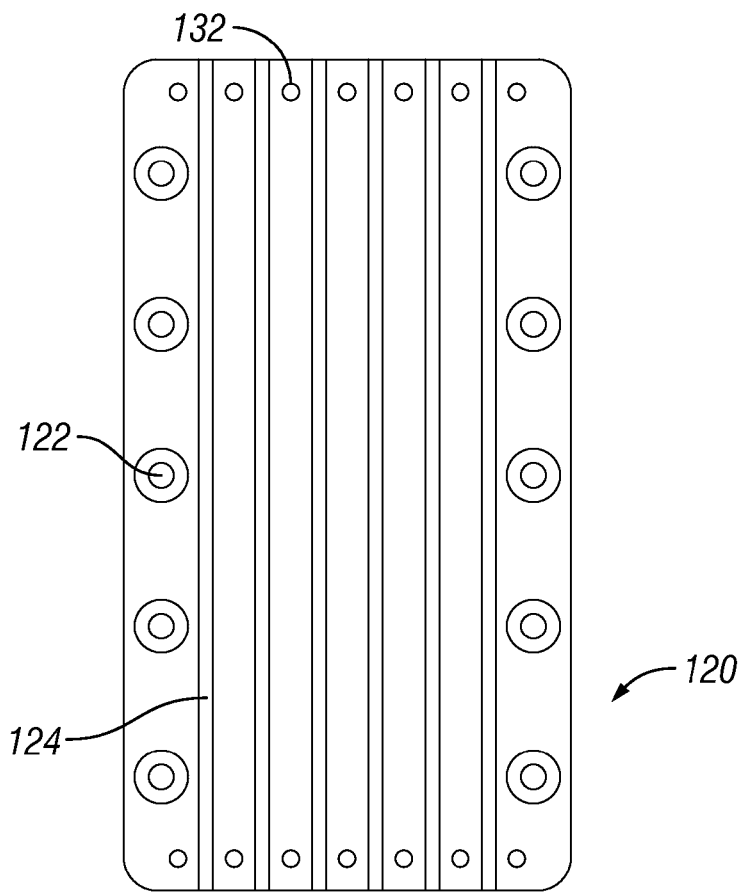
FIGS. 8A-8C are top, side and end views, respectively, of a coil base of the coil assembly of FIG. 4.
Figure 8B:
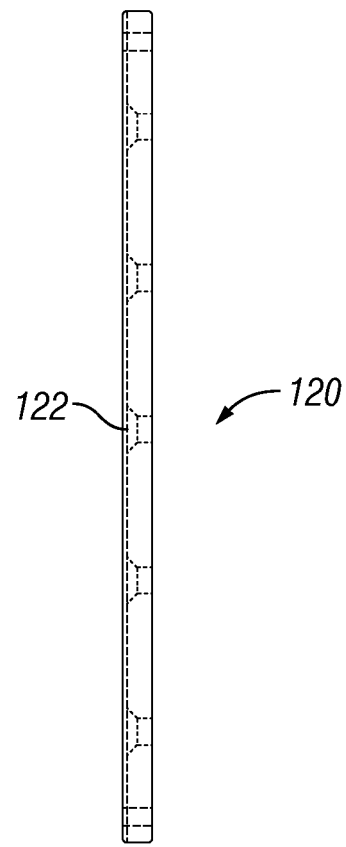
Figure 8C:
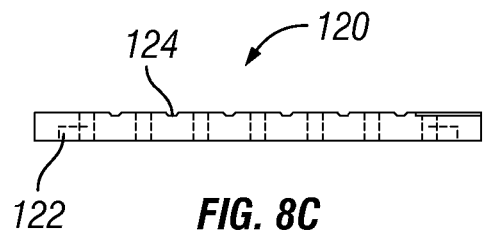
Figure 9A:
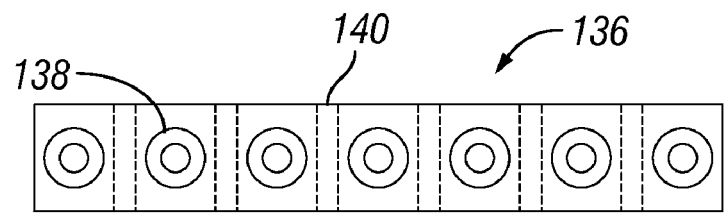
FIGS. 9A and 9B are top and side views, respectively, of a coil clamp of the coil assembly of FIG. 4.
Figure 9B:
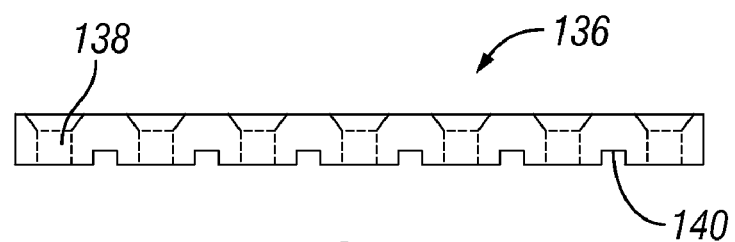
Figure 10A:
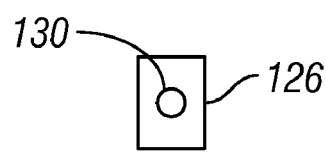
FIGS. 10A and 10B are top and side views, respectively, of a coil standoff of the coil assembly of FIG. 4.
Figure 10B:
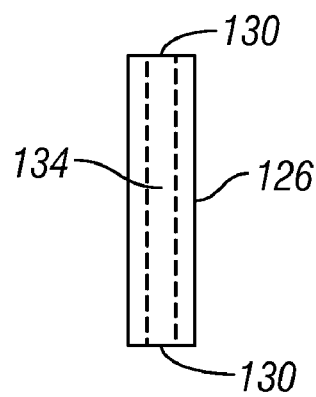

Referring to FIGS. 3 and 4, the coil assembly 110 includes a plurality of PCB coils 112 arranged in a row on a coil assembly base 120, such that a gap 114 is formed between adjacent PCB coils 112. The PCB coils 112 are electrically connected in series. As shown in FIGS. 3, 4 and 8A-8C, the coil assembly base 120 may be mounted to a base 302 of an FSM device 300 using mounting holes 122. As shown in FIGS. 3, 8A and 8C, the base member 120 includes retaining slots 124 for retaining a bottom end of the PCB coils 112. The coil assembly 110 further includes coil standoffs 126 (shown in FIGS. 4, 10A and 10B), which are arranged in two rows along opposing sides of the base member 120 and attached to the base member 120 via fastening holes 130, 132, and include retaining slots 134 for retaining longitudinal ends of the PCB coils 112. A pair of coil clamps 136, shown in FIGS. 9A and 9B, are arranged in two rows along the two opposing sides of the base member 120, and are fastened to the upper end ends of the coil standoffs 126 via fastening holes 130, 138 and matching screws (not shown). Screws, not shown, are used to fasten the coli standoffs 126 to the base member 120. The coil clamps are positioned to secure top edges of the PCB coils 112 within retaining slots 140.

Figure 5:
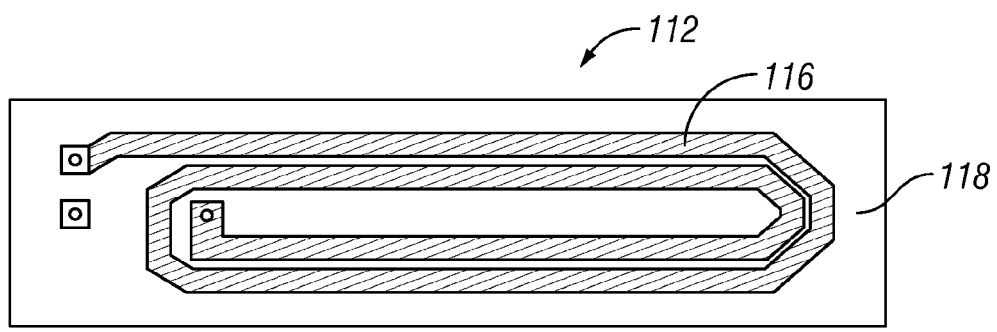
FIG. 5 is a top view of a PCB coil of the coil assembly of FIG. 4.
Figure 6:
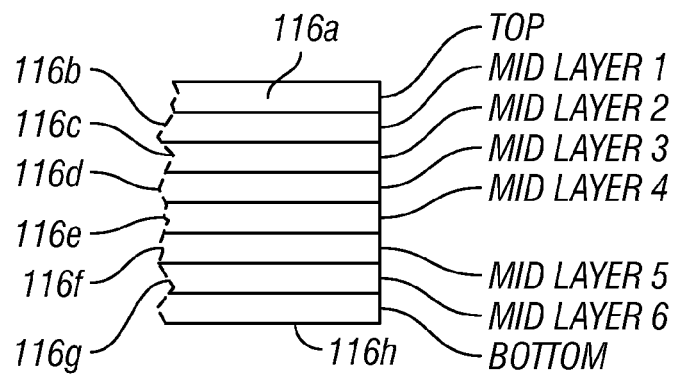
FIG. 6 is a cut-away side view showing the stacked layers of the coil members of the PCB coil of FIG. 5.
Figure 7:
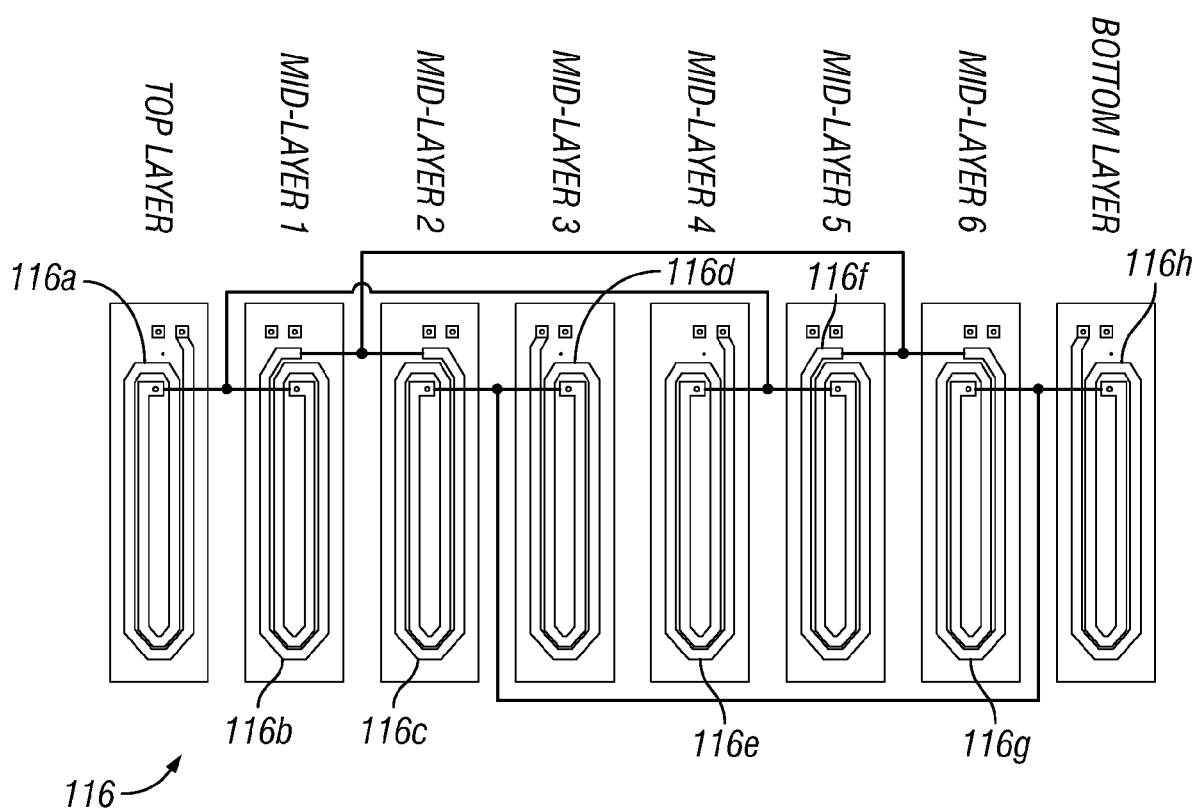
FIG. 7 is a schematic drawing showing the electrical interconnection of the stacked layers of the coil members of FIG. 6, wherein the stacked layers are connected to each other in series.

As illustrated in FIGS. 5-7, each PCB coil 112 includes a low-profile, substantially flat, coil member 116 mounted on a board member or PC board 118. The coil member 116 is wound in a substantially oval shape on the surface of the board member 118 and includes multiple coil layers 116a-116h stacked one on top of another and connected in series. The layers 116a-116h are insulated from each other by lamination (not shown). FIG. 7 shows a detailed schematic of the electrical connection of the coil layers 116a-116h. As shown in FIG. 7, individual coil layers are connected in series and pairs of coils are bridged together. In the example given, each coil member 116 includes eight coil layers configured to yield eight turns per board. The interconnect from the top layer 116a to the fifth middle layer 116f, the second middle layer 116b to the sixth middle layer 116g, etc. is with conductive vias through the board member 118. There are two turns per layer for the first four layers 116a-116d that are then connected in parallel to the next four layers 116e-116h. A PCB coil with the described configuration may have a thickness of about 0.04 in. Although one particular embodiment of a PCB coil is described above, it should be understood that other embodiments are possible, having varying numbers of layers and turns, varying connection schemes between layers and varying shapes and sizes.

Figure 11:
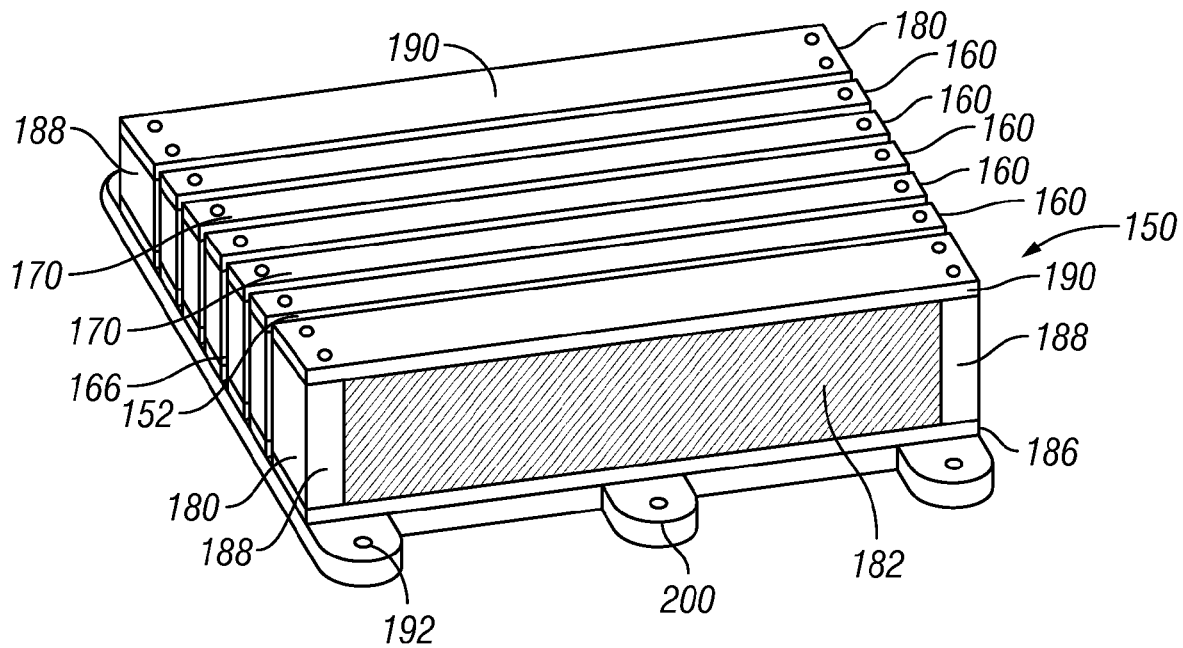
FIG. 11 is a perspective view of a magnet assembly of the PCB coil linear actuator of FIG. 3.

Turning to FIGS. 3 and 11, the magnet assembly 150 includes inner magnet units 160 at an interior area of the magnet assembly 150 and outer magnet units 180 placed at the ends of magnet assembly 150. The magnet units 160, 180 are arranged in a single row and are secured to a magnet assembly base 200 such that adjacent magnet units 160, 180 are separated by a gap 152 for accommodating a PCB coil 112. As shown in FIGS. 11 and 13A-13C, the base member 200 may be mounted to a mirror 304 of the FSM device 300 using mounting holes 192. It is also possible, and in some cases desirable, to mount the base member 120 of the coil assembly 110 to the FSM mirror side 304 and to mount the base member 200 of the magnet assembly to the FSM base 302.

As shown in FIGS. 3, and 12, the inner magnet units 160 each include a first or lower magnet 162 and a second or upper magnet 164. The lower magnet 162 and upper magnet 164 are arranged such that they have opposite polar orientation (indicated by "N" and "S"), with their polar axes being perpendicular to the planes of the coil members 116. With reference to FIGS. 3 and 14A-16B, the inner magnet units 160 further include an inner lower magnet clamp 166 (FIGS. 14A and 14B), an inner central magnet holder 168 (FIGS. 15A and 15B) and an inner upper magnet clamp 170 (FIGS. 16A and 16B) The inner lower magnet clamps 166 and inner upper magnet clamps 170 are substantially rod-shaped. The inner central magnet holder 168 is essentially H-shaped, having a horizontal portion 168a and vertical portions 168b at opposite ends of the horizontal portion 168a. The inner lower magnet clamps 166 and inner upper magnet clamps 170 attach to lower and upper ends, respectively, of the vertical portions 168b of the inner central magnet holder 168 via fastening holes 166a, 168c and 170a and matching fasteners (not shown). Thus, the lower magnet 162 is secured between the inner lower magnet clamp 166 and the inner central magnet holder 168, while the upper magnet 164 is secured between the inner upper magnet clamp 170 and the inner central magnet holder 168. The inner lower magnet clamps 166 are attached to the magnet assembly base 200 by fasteners (not shown) inserted in fastening holes 166b and matching holes in the base 200 (not shown).

Figure 12A:
FIGS. 12A and 12B are perspective views showing two faces of a magnet of the magnet assembly of FIG. 11.
Figure 12B:
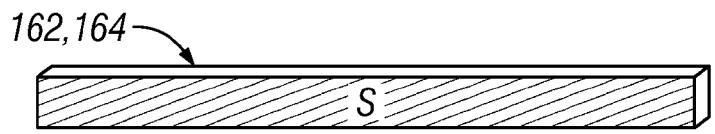
Figure 14A:
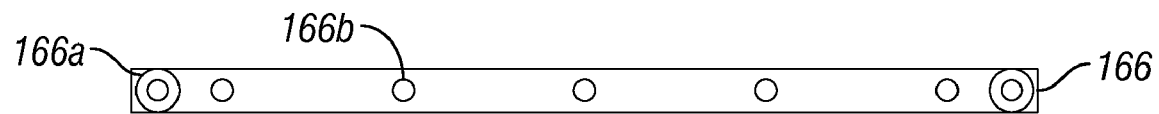
FIGS. 14A and 14B are top and side views, respectively, of an inner lower magnet clamp of the magnet assembly of FIG. 11.
Figure 14B:
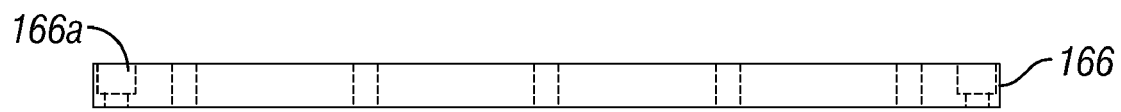
Figure 15A:
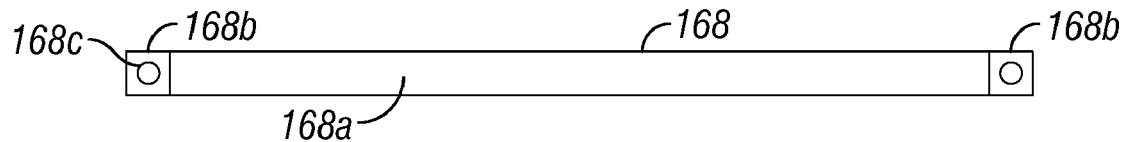
FIGS. 15A and 15B are top and side views, respectively, of an inner magnet holder of the magnet assembly of FIG. 11.
Figure 15B:
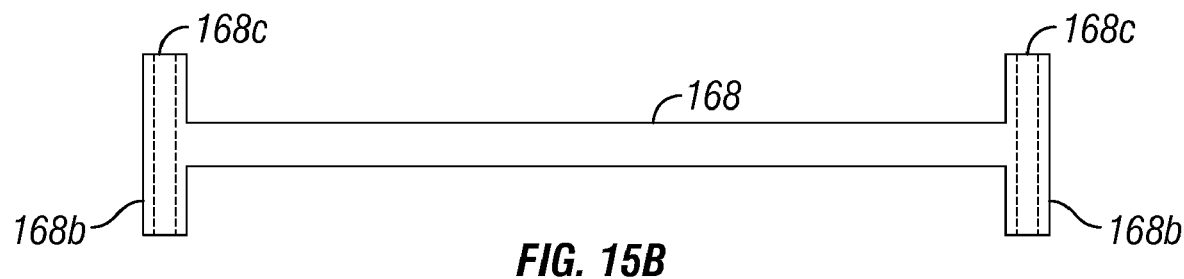
Figure 16A:
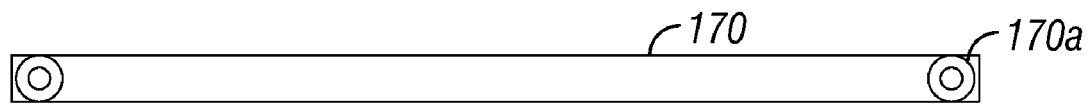
FIGS. 16A and 16B are top and side views, respectively, of an inner upper magnet clamp of the magnet assembly of FIG. 11.
Figure 16B:
Figure 17A:
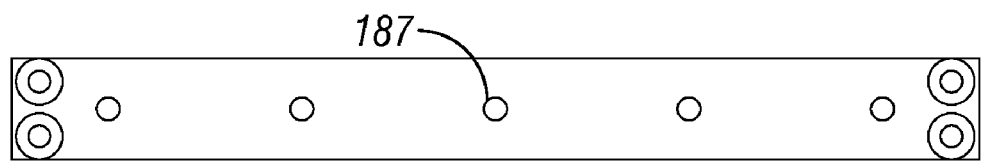
FIGS. 17A and 17B are top and side views, respectively, of an outer lower magnet clamp of the magnet assembly of FIG. 11.
Figure 17B:
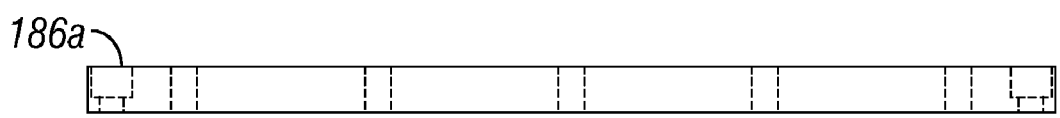
Figure 18A:
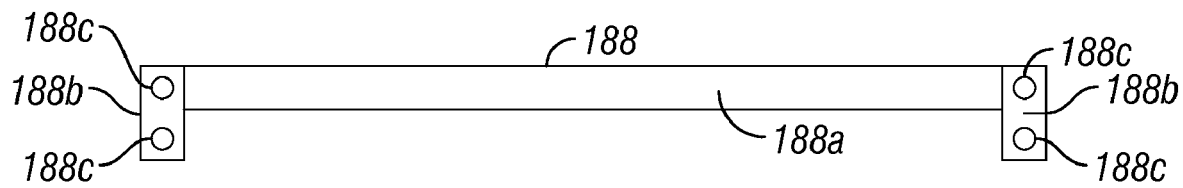
FIGS. 18A and 18B are top and side views, respectively, of an outer magnet holder of the magnet assembly of FIG. 11.
Figure 18B:
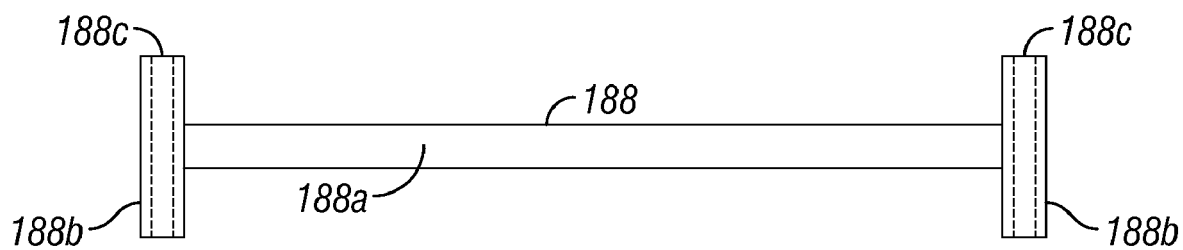
Figure 19A:
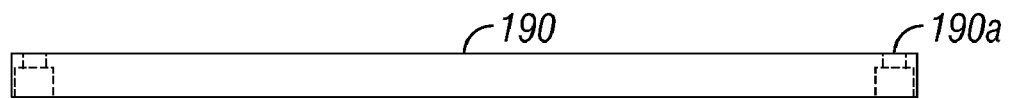
FIGS. 19A and 19B are top and side views, respectively, of an outer upper magnet clamp of the magnet assembly of FIG. 11.
Figure 19B:
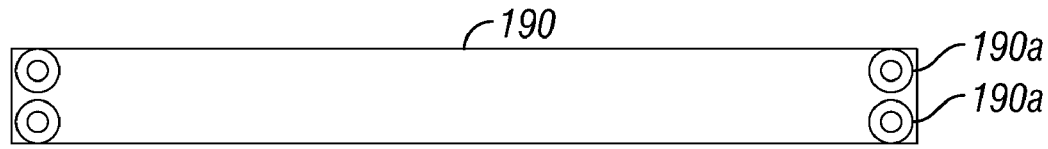
Figure 20A:
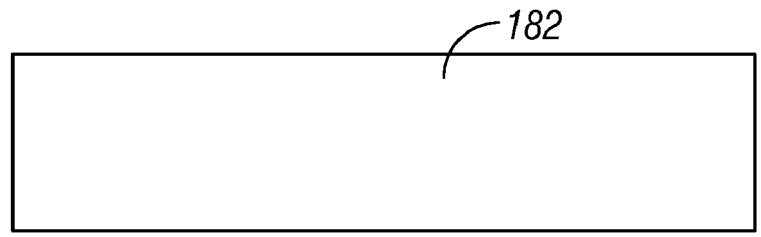
FIGS. 20A and 20B are top and side views of magnet shunts forming the pole pieces of the magnet assembly of FIG. 11.
Figure 20B:
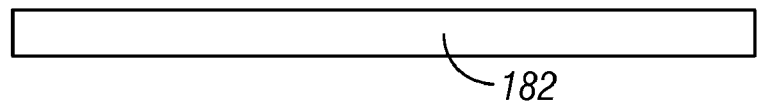
Figure 21:
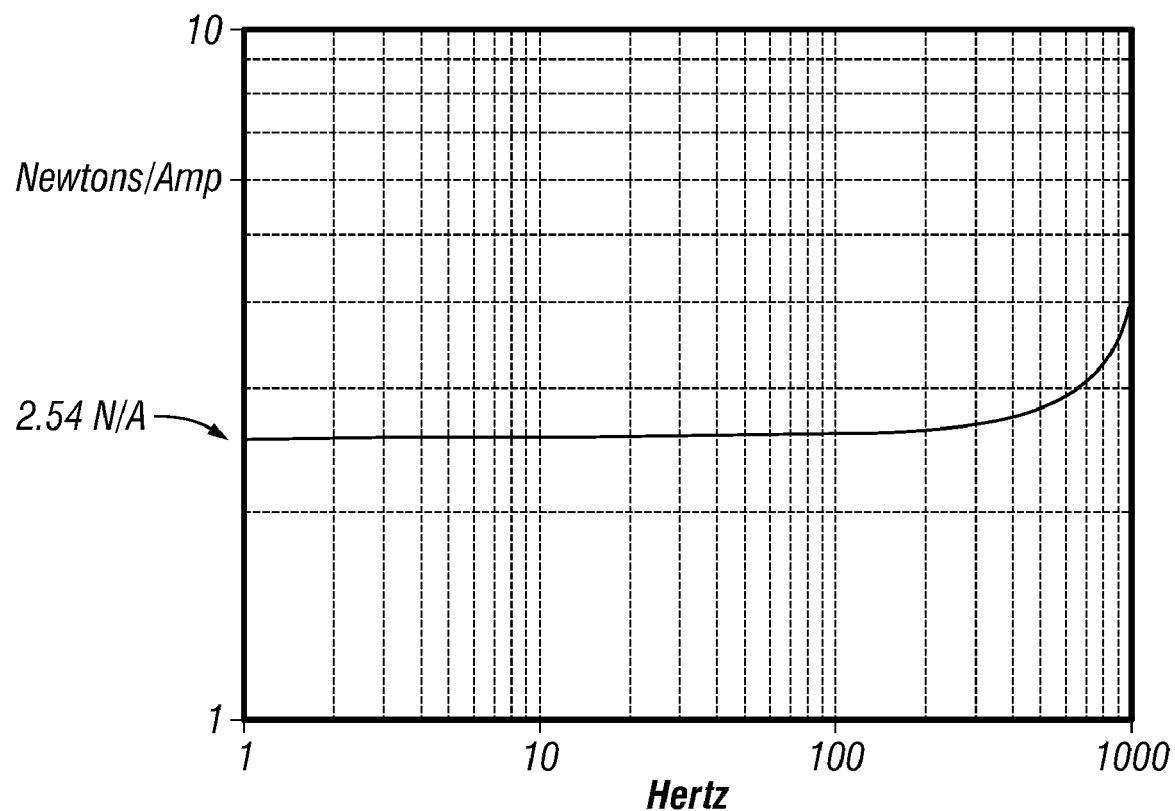
FIG. 21 is a graph showing the magnitude response of a PCB coil linear actuator.

As shown in FIGS. 3, 12A and 12B, each of the outer magnet units 180 also includes a first or lower magnet 162 and a second or upper magnet 164 arranged such that they have opposite polar orientations (indicated by "N" and "S"), with their polar axes being perpendicular to the planes of the coil members 116. The outer magnet units 180 further include a pole piece or shunt 182 (FIGS. 20A and 20B). With reference to FIGS. 3 and 17A-19B, the outer magnet units 160 further include an outer lower magnet clamp 186 (FIGS. 17A and 17B), an outer central magnet holder 188 (FIGS. 18A and 18B) and an upper magnet clamp 190 (FIGS. 19A and 19B) The outer lower and outer upper magnet clamps 186 and 190 are substantially bar-shaped. The outer central magnet holder 188 is essentially H-shaped, having a horizontal portion 188a and vertical portions 188b at opposite ends of the horizontal portion 188a. The outer lower magnet clamps 186 and outer upper magnet clamps 190 attach to lower and upper ends, respectively, of the vertical portions 188b of the outer central magnet holder 188 via fastening holes 186a, 188c and 190a. Thus, the lower magnet 162 is secured between the outer lower magnet clamp 186 and the outer central magnet holder 188, while the upper magnet 164 is secured between the outer upper magnet clamp 190 and the outer central magnet holder 188. The pole piece 182 is positioned outside of the upper and lower magnets 162, 164 in the outer magnet unit 180 and is secured between the outer lower magnet clamp 186 and the outer upper magnet clamp 190. The outer lower magnet clamps 186 attach to the magnet assembly base 200 by mounting holes 187 and 194.

The magnets 162, 164 may be, by way of example, 35 MGOe Neodymium Boron Iron (NdBFe) energy product magnets. For higher performance, the magnets 162, 164 may be 50 MGOe NdBFe permanent magnets. For high temperature operation, high energy product samarium cobalt magnets 162, 164 may be used. Other types of magnets may be used, as well. The pole pieces may be made of readily available carbon steel, for example, C1008, which has a saturation flux density of about 18,000 Gauss. Higher performance can e achieved, however, by constructing the pole pieces 182 from Hiperco 50A (also known as Vanadium Permendur), which has a saturation flux density up to 23,000 Gauss. Because of the higher flux density, less Hiperco 50A would be required than C1008 by the ratio of the flux densities, which would reduce the weight of the actuator.

The other, non-magnetic members of the magnet assembly (i.e., magnet assembly base 200, lower magnet clamps 166, 186, central magnet holders 168, 188 and upper magnet clamps 170, 190, as well as the coil base member 120, coil standoffs 128a, 128b and coil clamps 136 may be made from aluminum or another suitable material. One other possible material is Torlon (polyimide-amide, PIA), which is strong has high temperature resistance and exhibits a thermal coefficient of expansion which is very close to that of C1008 and Neodymium magnets. Aluminum is stronger than Torlon, but is twice as heavy. These and other materials may be used based on design considerations such as weight, structural rigidity and cost.

According the embodiment shown, seven magnet units are provided, including five inner magnet units 160 and two outer magnet units 180, thereby providing a total of fourteen magnets. The magnet assembly 150 is designed with the coil assembly 110 in mind. When the actuator 100 is assembled (FIG. 3), the coil assembly 110 and the magnet assembly 150 interface such that the coil assembly base 120 and the magnet assembly base 200 are positioned at opposing sides, the PCB coils are inserted into the gaps 152 between adjacent magnet units 160 and 180, the inner magnet units 160 are inserted into the gaps 114 between adjacent inner PCB coils 112 and the outer magnet units 180 are positioned outside of the outer PCB coils 112. Thus, the PCB coils 112 and magnet units 160, 180 are arranged in alternating fashion along the length of the actuator 100. It should be understood that the actuator 100 can be scaled up or down in similar configurations having various numbers of PCB coils and magnet units 160, 180.

In operation, when a current is applied to the PCB coils 112, the coils 112 produce a magnetic field which interacts with the magnetic fields produced by the magnet assemblies 160, 180, thereby providing movement of the mirror side 304 of the FSM 300 proportional to the applied current. The force applied by the actuator is determined by the equation:

$$F(\text{newtons}) = NILB$$

where:

$N$ = the effective number of turns;

$I$ = the current flowing into the PCB coil (amps);

$L$ = the effective length of 1 turn (meters) normal to the magnetic field;

and $B$ = the average magnetic field flux density (tesla) applied normally through the PCB coils The performance characteristics and benefits of the inventive actuator can be appreciated from the following example.

EXAMPLE

A prototype PCB coil linear actuator was evaluated for a FSM application. Some key parameters for the actuator were a required stroke of ±0.032 in. (0.8 mm), a gap between the coil assembly and magnet assembly of 0.020 in. (0.5 mm) and a peak force greater than 50 Newtons. Further parameters for the prototype were as follows.

The prototype PCB coil linear actuator employed six, eight-layer PCB coils having a thickness of 0.040 in. and an equivalent of eight turns per board. The PCB coils were connected in series, resulting in 48 effective turns. The footprint of each PCB coil was 3.00 in.×0.675 in. The prototype further employed fourteen 35 MG NdBFe magnets (2 in. long and about 3/8 in. wide) and C1008 pole pieces. The non-magnetic, structural members of the actuator were constructed of aluminum. The predicted and actual test results test results for the first prototype, in comparison with the test results for a conventional voice coil actuator (VCA), appear in the following Table 1.

TABLE 1

Actual vs. Predicted Performance of PCB Coil Linear Actuator Prototype

| Actuator Parameter | Symbol | Typical Voice Coil Actuator | PCB Coil Actuator | Units |
|---|---|---|---|---|
| ELECTRICAL | | | Actual | |
| Force Constant | $K_F$ | 5.8 | 2.54 | Newtons/Amp |
| Motor Constant | $K_M$ | 2.8 | 4.33 | Newtons/√Watt |
| Back EMF Constant | $K_B$ | 5.8 | 2.54 | Volts/(meter/sec) |
| Nominal Force | $F_{nom}$ | 6.75 | 10.61 | Newtons |
| Voltage @ Nominal Force | $V_{nom}$ | 5.12 | 1.43 | Volts |
| Current @ Nominal Force | $I_{nom}$ | 1.164 | 4.18 | Amps |
| Power @ Nominal Force | $P_{nom}$ | 6.0 | 6.0 | Watts |
| Peak Force (20% Duty Cycle) | $F_{pk}$ | 33.8 | 53.4 | Newtons |
| Voltage @ Peak Force | $V_{pk}$ | 26.2 | 7.2 | Volts |
| Current @ Peak Force | $I_{pk}$ | 5.8 | 21.05 | Amps |
| Power @ Peak Force | $P_{pk}$ | 152 | 152 | Watts |
| Voltage for 21 N Req'd Force per Actuator 6 for 12" Dia. BSM | | 15.93 | 2.84 | Volts |
| Current for 21 N Req'd Force per Actuator for 12" Dia. BSM | | 3.62 | 8.28 | Amps |
| Power for 21 N Req'd Force per Actuator for 12" Dia. BSM | | 57.68 | 23.50 | Watts |
| DC Winding Resistance | $R_c$ | 4.4 | 0.343 | Ω |
| Winding Inductance | $L_c$ | 1.4 | 0.044 | milli-Henries |
| MECHANICAL | | | | |
| Nominal Actuator Length | $L_{nom}$ | 1.56 (39.62) | 0.887 (22.4) | inch (millimeters) |
| Coil Weight | $m_{coil}$ | 25 | 67.0 | grams |
| Magnet Weight | $m_{mag}$ | 19.6 | 142.0 | grams |
| Actuator Total Weight | $m_{act}$ | 22.1 | 209.0 | grams |
| Clearance each Side of Coil | | ±0.020 (±0.51) | ±0.020 (±0.51) | inch (millimeters) |
| Stroke | | ±0.20 (±5.08) | ±0.032 (±0.81) | inch (millimeters) |
| Coil Thermal Resistance to Base | $\phi_{TH}$ | 5.0 | <5.0 | ° C./Watt |

With reference to Table 1, the actuator, as tested, exhibited the following properties:
- force constant—2.54 Newtons/Amp
- motor constant—4.33 Newtons/Watt$^{1/2}$
- winding resistance—0.343 ohms
- winding inductance—<0.044 milli-Henries
- nominal actuator length—0.887 in. (22.4 mm)
- coil weight (base side)—67.0 g
- magnet weight (mirror side)—142.0 g
- total actuator weight—209 g
- electrical time constant (L/R)—128 μsec FIG. 20 is a graph of actuator magnitude response, showing the results of the prototype testing.

By comparison, a typical example VCA has the following parameters:
- force constant—5.8 newtons/amp
- motor constant—2.8 newtons/watt$^{1/2}$
- winding resistance—4.4 ohms
- winding inductance—<1.4 milli-Henries
- nominal actuator length—1.56 in. (39.62 mm)
- coil weight—25 g
- magnet weight—196 g
- total actuator weight—221 g
- electrical time constant (L/R)—318 μsec From the above, it can be seen that the prototype proved that superior performance is provided by the inventive actuator design, and exhibited actual performance above the predicted performance in the critical area of efficiency. For example, the actual motor constant was calculated to be 4.33 newtons/watt$^{1/2}$, which was 54% higher than the typical VCA with approximately the same total actuator weight. The motor constant indicates the overall efficiency of the actuator. The VCA in this example has more effective turns resulting in a high force constant but with much less efficiency. The PCB coil actuator also can be configured for a higher force constant by increasing the effective number of turns, but in this case the design was for an ultra-low resistance actuator (0.343 ohms vs. 4.4 ohms for the example VCA. The motor constant is a function of the force constant and the resistance as follows: $K_M = K_F / R^{1/2}$.

The PCB coil actuator prototype was designed to generate 21 newtons of force. For example, the tested prototype required only 23.5 watts of power to generate 21 newtons of force, as opposed to the 57.68 watts required by the VCA. Thus, the prototype required only 41% of the power required by the VCA to produce the same force. Additionally, the tested prototype had a time constant of 128 μsec versus a time constant of 318 μsec for the VCA. The prototype's tested time constant is 40% of that currently being used in 1 kHz loops, so there is no reason to believe that the inventive actuator cannot be used to close 2 kHz loops.

The performance of the PCB coil actuator can be improved by using higher performance materials such as vanadium permendur and 50 MGOe magnets.

The embodiments described hereinabove are further intended to explain best modes know of practicing the invention and to enable others skilled in the art to utilize the invention in such, or other, embodiments and with various modifications required by the particular applications or uses of the invention. Accordingly, the description is not intended to limit the invention to the form disclosed herein. Also, it is intended that the attached claims be construed to include alternative embodiments not explicitly defined in the detailed description.

I claim:

1. An electromagnetic actuator comprising:
a coil assembly including a plurality of printed circuit board coils electrically connected to each other in series, said plurality of printed circuit board coils being arranged to generate an electromagnetic field; and
a magnet assembly comprising a plurality of magnets units, each said magnet unit including at least one magnet arranged to generate a magnetic field interacting with said electromagnetic field.

2. The electromagnetic actuator of claim 1, wherein each said printed circuit board coil comprises a substantially flat coil member disposed on a PC board.

3. The electromagnetic actuator of claim 2, wherein said coil member comprises a plurality of coil layers stacked one on top of the other.

4. The electromagnetic actuator of claim 3, wherein said plurality of coil layers comprises eight coil layers, and wherein each of a first four layers among said eight coil layers has two turns that are connected in parallel to a subsequent four layers among said eight coil layers.

5. The electromagnetic actuator of claim 2, wherein said at least one magnet comprises a first magnet and a second magnet stacked one on top of the other, said first magnet and said second magnet having polar axes that are perpendicular to a surface plane of the at least one coil member, wherein said first magnet and said second magnet have opposite polar orientations.

6. The electromagnetic actuator of claim 1, wherein said magnet assembly comprises outer magnet units disposed at the ends of said magnet assembly and pole pieces disposed outside of the magnets on said outer magnet units, thereby closing a magnetic circuit of the actuator.

7. The electromagnetic actuator of claim 1, wherein:
said coil assembly comprises:
a first base member arranged to secure said coil assembly to one of a mirror and a base of a fast steering mirror device, and
at least one coil clamp arranged to secure said at least one printed circuit board coil to said first base member; and
said magnet assembly comprises:
a second base member arranged to secure said magnet assembly to the other of said mirror and said base of said fast steering mirror device; and
at least one element arranged to secure said at least one magnet to said second base member.

8. An electromagnetic actuator comprising:
a coil assembly comprising a plurality of printed circuit board coils arranged to generate an electromagnetic field, said printed circuit board coils being arranged in a row so as to provide gaps between adjacent ones of said printed circuit board coils; and
a magnet assembly comprising a plurality of magnet units arranged in a row so as to provide gaps between adjacent ones of said magnet units, each of said magnet units comprising magnet arranged to produce a magnetic field, wherein:
said magnet units and said printed circuit board coils are arranged in alternating fashion along the length of said actuator such that interior ones of said magnet units are disposed in said gaps between said adjacent ones of said printed circuit board coils, and said printed circuit board coils are disposed in said gaps between said adjacent ones of said magnet units, and
exterior ones of said magnet units are disposed at ends of said actuator outside of outermost ones of said printed circuit board coils.

9. The electromagnetic actuator of claim 8, wherein:
said coil assembly comprises:
- a first base member arranged to secure said coil assembly to one of a mirror and a base of a fast steering mirror device, and
- coil clamps arranged to secure said printed circuit board coils to said first base member; and said magnet assembly comprises:
- a second base member arranged to secure said magnet assembly to the other of said mirror and said base of said fast steering mirror device; and
- elements arranged to secure said magnet units to said second base member.

10. The electromagnetic actuator of claim 8, wherein said magnet assembly comprises outer magnet units disposed at the ends of said magnet assembly and pole pieces disposed outside of the magnet in said outer magnet units, thereby closing a magnetic circuit of the actuator.

11. The electromagnetic actuator of claim 8, wherein said each of said printed circuit board coils comprises a substantially flat coil member disposed on a PC board.

12. The electromagnetic actuator of claim 11, wherein said coil member comprises a plurality of coil layers stacked one on top of the other.

13. The electromagnetic actuator of claim 12, wherein said plurality of coil layers comprises eight coil layers, and wherein each of a first four layers among said eight coil layers has two turns that are connected in parallel to a subsequent four layers among said eight coil layers.

14. The electromagnetic actuator of claim 8, wherein said printed circuit board coils are electrically connected to each other in series.

15. The electromagnetic actuator of claim 8, wherein said at least one magnet comprises a first magnet and a second magnet stacked one on top of the other, said first magnet and said second magnet having polar axes that are perpendicular to a surface plane at least one coil member, wherein said first magnet and said second magnet have opposite polar orientations.

* * * * *

UNITED STATES PATENT AND TRADEMARK OFFICE
CERTIFICATE OF CORRECTION

PATENT NO. : 7,663,269 B2 Page 1 of 1
APPLICATION NO. : 11/610280
DATED : February 16, 2010
INVENTOR(S) : Darren R. Laughlin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Thirtieth Day of November, 2010

David J. Kappos
*Director of the United States Patent and Trademark Office*